United States Patent [19]
Kieffaber

[11] 3,901,482
[45] Aug. 26, 1975

[54] DOUGH MIXER

[75] Inventor: Clarence A. Kieffaber, Overland Park, Kans.

[73] Assignee: Marion Corporation, Kansas City, Kans.

[22] Filed: May 20, 1974

[21] Appl. No.: 471,214

[52] U.S. Cl. .................................. 259/6; 259/192
[51] Int. Cl.² .......................................... B01F 7/04
[58] Field of Search ............ 259/192, 185, 104, 109, 259/110, 6, 9, 10, 21, 25, 26, 41, 45, 46

[56] References Cited
UNITED STATES PATENTS

| | | | |
|---|---|---|---|
| 1,370,893 | 3/1921 | Komarek | 259/104 |
| 1,941,244 | 12/1933 | Bouda | 259/109 |
| 2,600,408 | 6/1952 | Komarek | 259/6 |
| 3,638,920 | 2/1972 | Davis | 259/104 |
| 3,694,227 | 9/1972 | Vezzani | 259/185 |

*Primary Examiner*—Robert W. Jenkins

[57] ABSTRACT

A continuous dough mixer has an elongated trough-like body portion with a discharge outlet adjacent one end thereof and means for continuously feeding dough ingredients into it near the other end thereof. A pair of parallel shafts extend lengthwise in the body portion and rotate in the same direction. Paddles extend from the shafts at such oblique angles to the shafts axes as to advance the mixer contents lengthwise of the body portion toward said outlet and include dough developing paddles that have ribs extending lengthwise of the paddles provided by a round rod embracing a marginal edge of each paddle. The body portion has a transverse baffle wall extending downwardly into it to divide it into a zone into which the dough ingredients are continuously fed, and a hydrating and developing zone. A conveyer feeds scrap dough continuously into the hydrating and developing zone. A paddle is mounted on each shaft adjacent the end wall of the mixer at the outlet thereof, which is inclined relative to the axes of the shafts to direct the dough away from the bearings for the shafts at the end of the body portion adjacent the discharge outlet.

19 Claims, 10 Drawing Figures

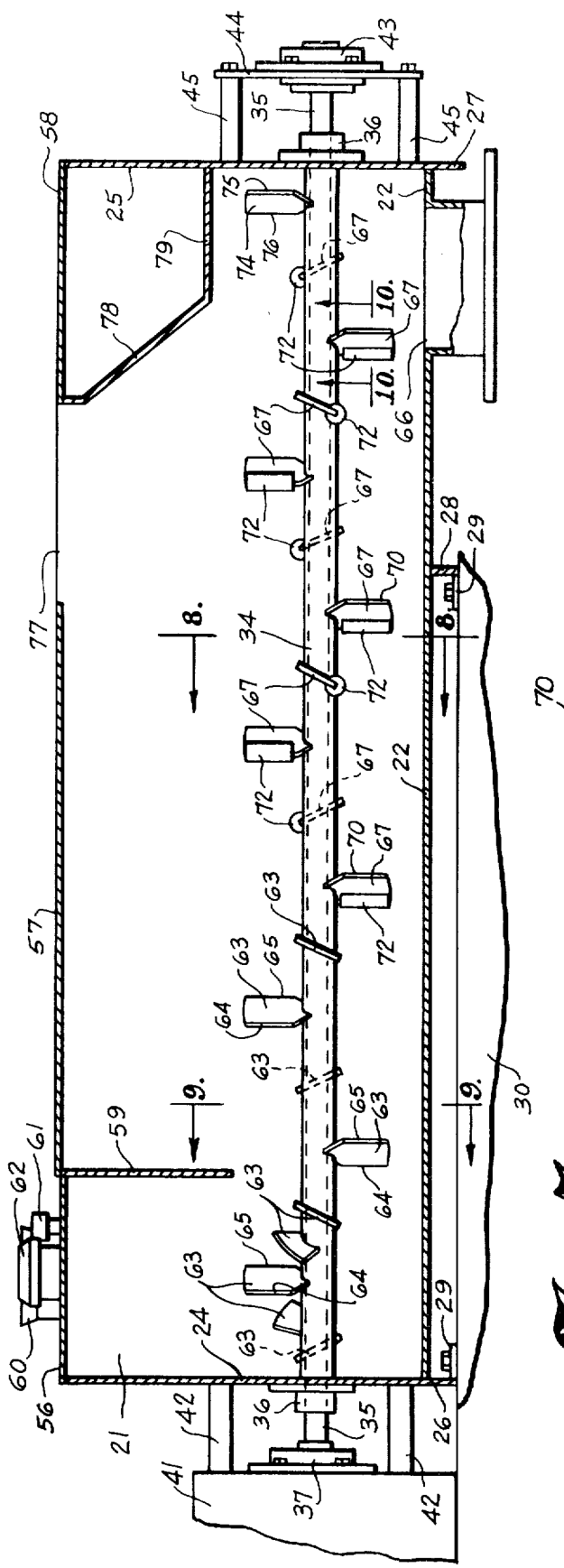
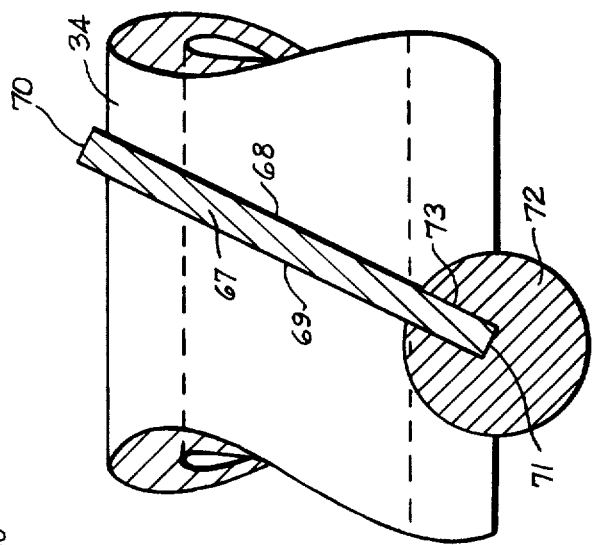
Fig. 7.
Fig. 10.

DOUGH MIXER

There have been trough-like dough mixer bodies of an elongated character provided with a large number of short thick paddles mounted on parallel shafts that extend lengthwise of the body portion of the mixer for continuously mixing the dough ingredients. The paddles previously provided on such an apparatus do not exert the desired continuous hydrating and developing action on dough of the character used for making pizzas and similar products, because of their tendency to slip through the contents of the mixer without exerting the amount of pull and kneading action on the dough required for hydrating and developing a dough of the character used for making the above referred to products, but instead exert a cutting action on the gluten strands in such a dough.

In order to provide desirable dough developing action such expedients have been used as providing spiral flanges on the shafts, which flanges are provided with laterally projecting ears. Curved blades that are of different lengths have been provided on a shaft so as to provide less conveying action by means of the shorter blades than by means of the longer blades. The difference in movement of the material provided by the two lengths of blades is intended to provide better agitation of the mass of dough material. While a large number of thick short paddles have been provided as agitating means for doughs, these paddles are of the same thickness throughout and still have a tendency to cut through the gluten strands in doughs such as used for pizzas and similar products instead of creating a pulling action on the gluten strands.

The provision of dough developing paddles that have ribs thereon that have transversely convexly curved surfaces to provide a thick transversely cylindrically curved edge portion on the paddle, provide such paddles that movement of the paddles through the dough mixture will exert the desired pulling forces on the dough mixture to first bring about the absorption of the liquid ingredients in the dry ingredients and then develop the gluten on the dough mixture so that the dough will have the desired cell wall strength to prevent escape of the gas that is trapped in the dough. Such gas retention is required in order to get the desired lightness of the resulting product.

It is accordingly the purpose of my invention to provide a continuous dough mixer that has an elongated troughlike body portion that is open to the atmosphere with dough hydrating and developing means comprising paddles mounted on parallel shafts, that rotate in the same direction, which paddles have a flat faced body portion that is provided with means for providing a thickened portion along the leading side edge of the paddles, comprising a round rod mounted in embracing relation to said side edge so as to provide a convexly transversely curved blunt side edge on each of said paddles to obtain the pulling action on the dough mixture that is desired to develop the gluten and prevent cutting up the strings of gluten by the paddles.

Other objects and advantages of my invention will appear as the desciption of the drawings proceeds. I desire to have it understood, however, that I do not intent to limit myself to the particular details shown or described except as defined in the claims.

In the drawings:

FIG. 7 is a longitudinal sectional view of the mixer partly broken away.

FIG. 10 is an enlarged fragmentary detail view partly in section and partly in elevation taken on the line 10—10 of FIG. 7.

Figure 1:
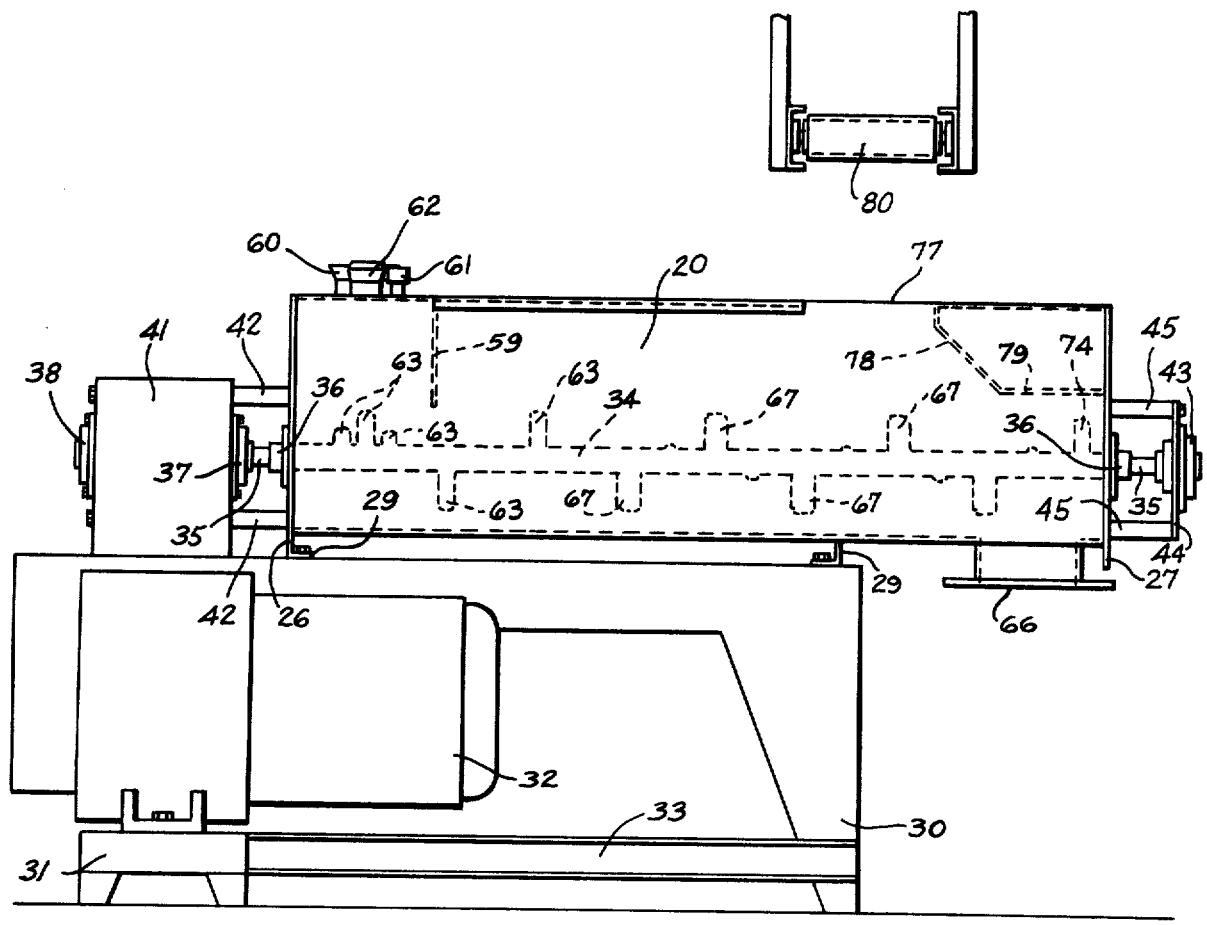
FIG. 1 is a view in side elevation of my improved dough mixer showing a fragmentary portion of means for feeding scrap dough to the mixer.
Figure 8:
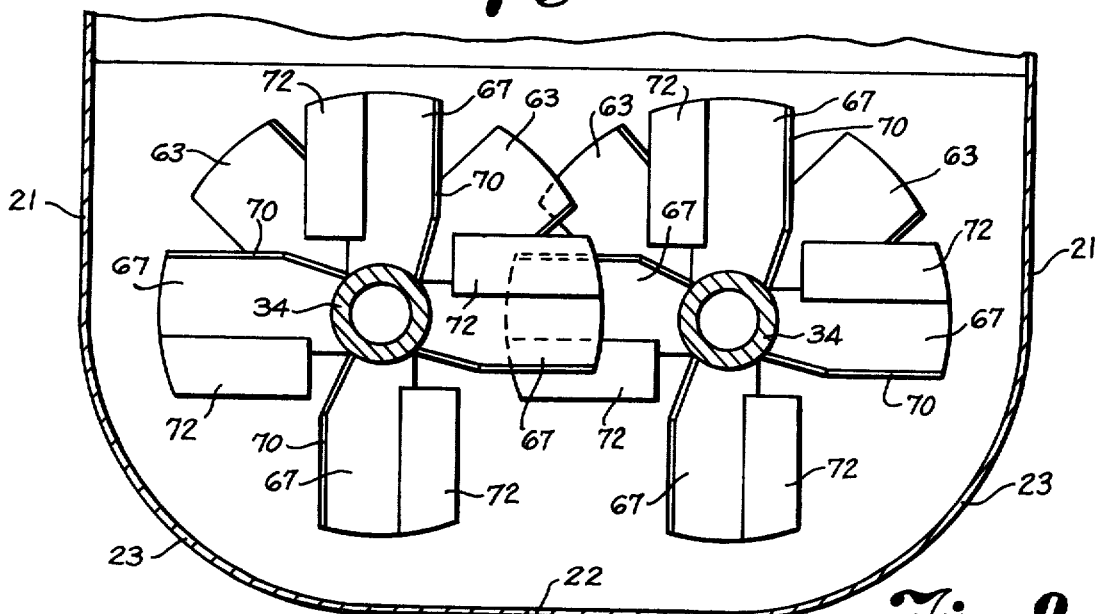
FIG. 8 is a fragmentary sectional view thereof on an enlarged scale taken on the line 8—8 of FIG. 7.
Figure 2:
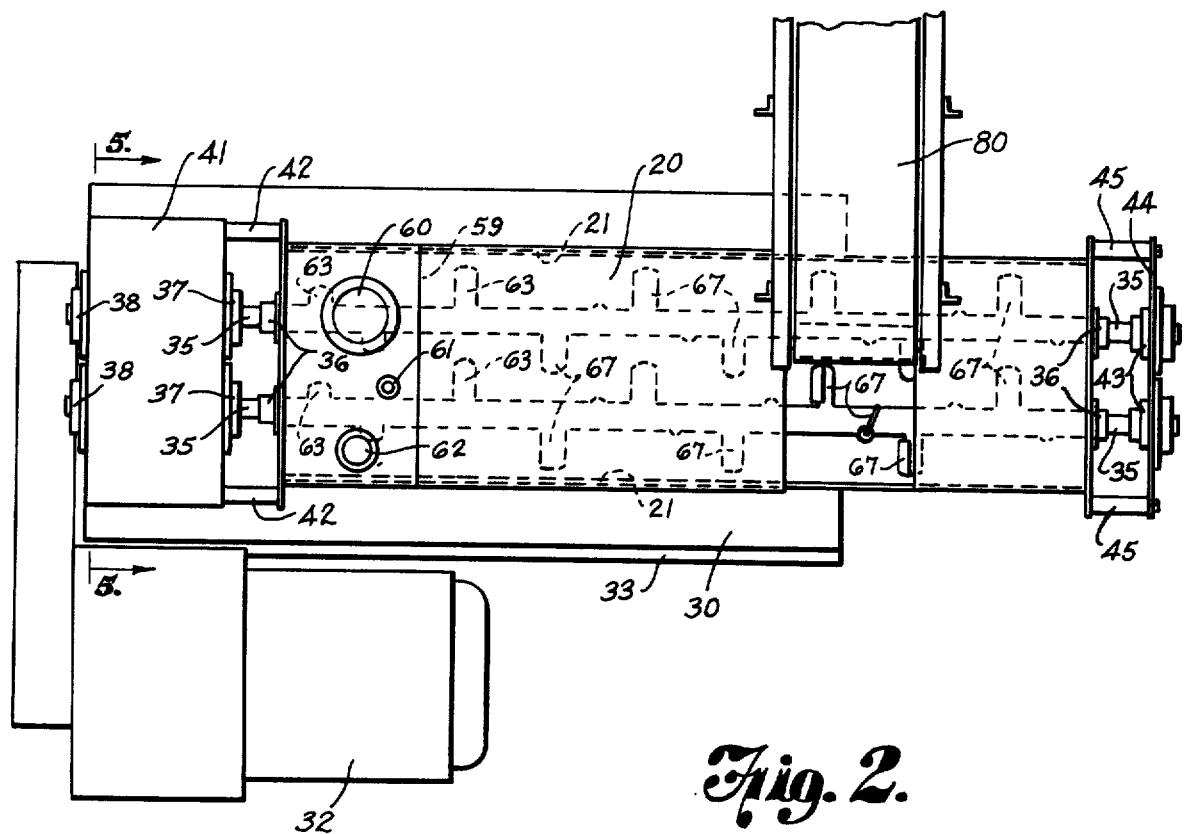
FIG. 2 is a plan view thereof.
Figure 9:
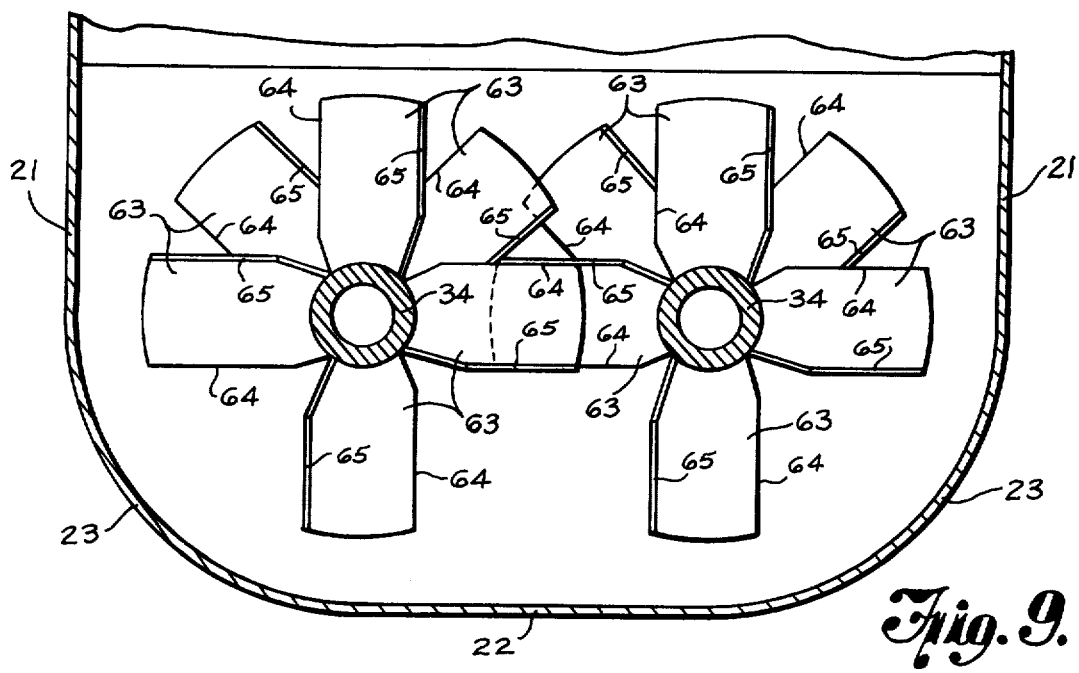
FIG. 9 is a similar view taken on the line 9—9 of FIG. 7.
Figure 3:
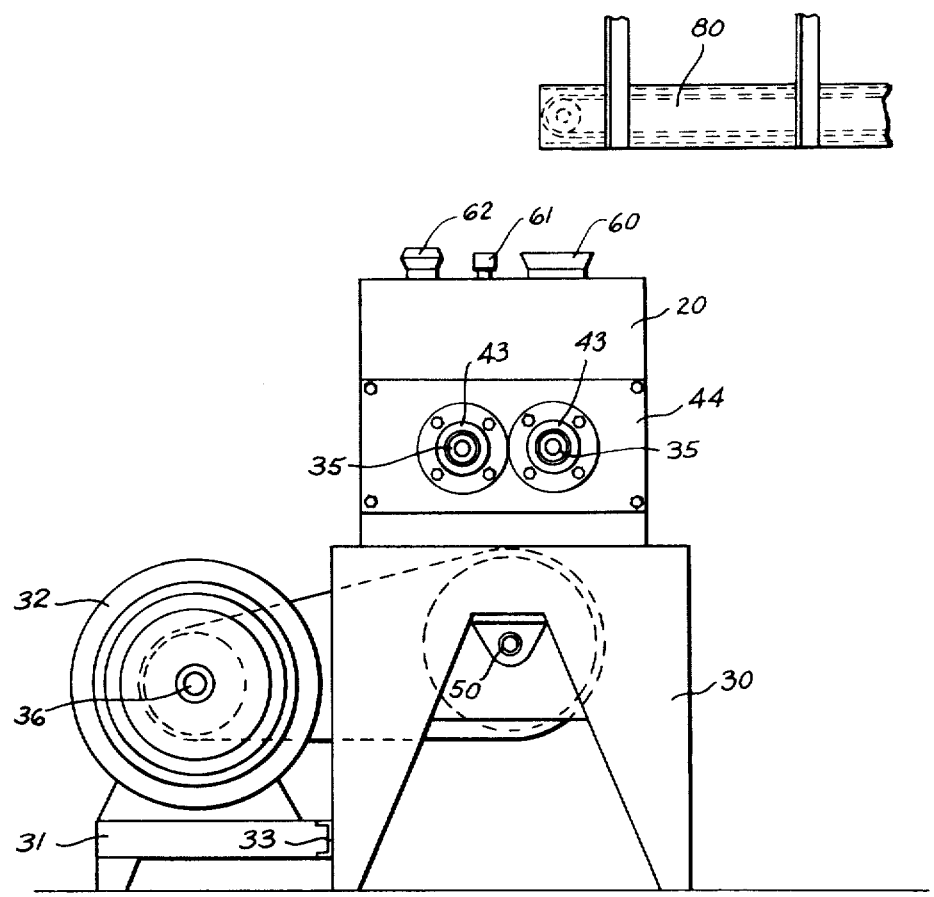
FIG. 3 is an end elevation thereof.
Figure 5:
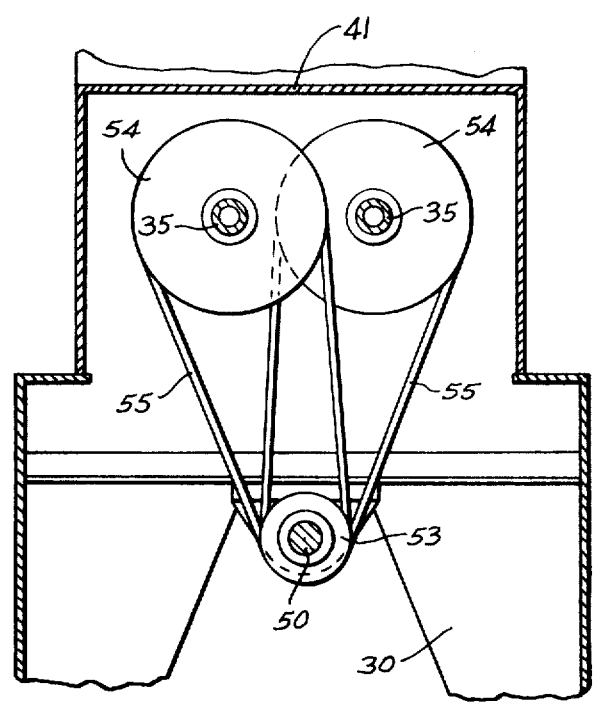
FIG. 5 is a fragmentary section thereof taken on the line 5—5 of FIG. 2, on an enlarged scale.
Figure 4:
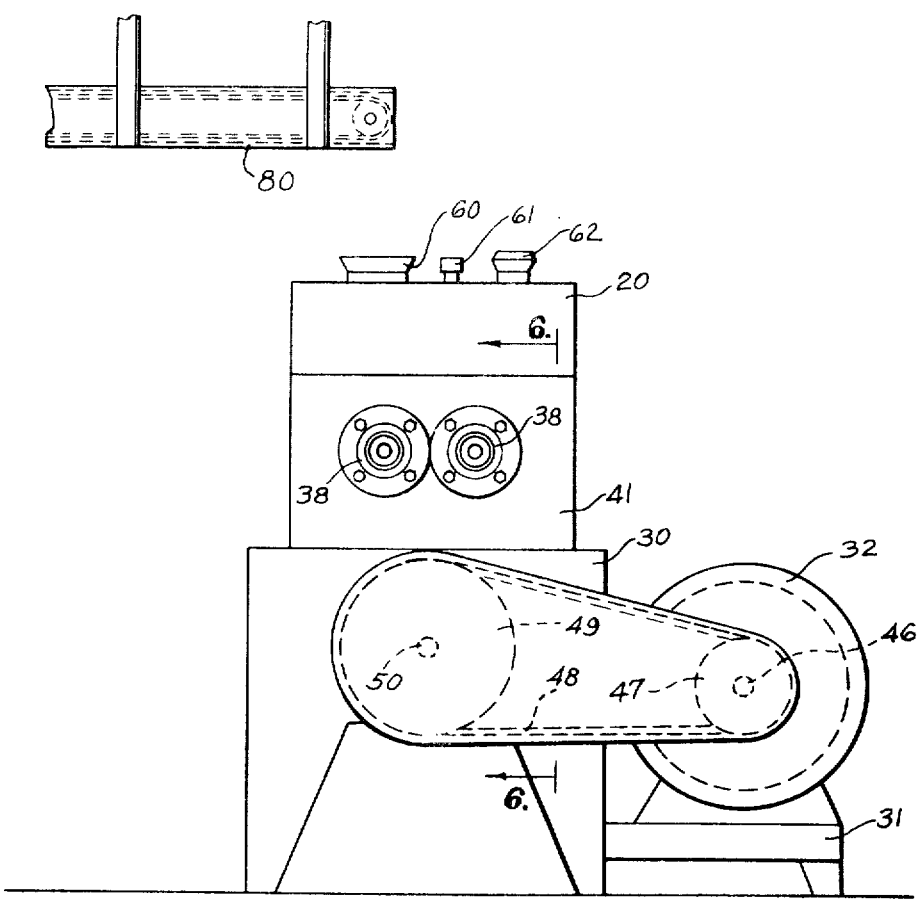
FIG. 4 is an end elevation thereof showing the opposite end to that shown in FIG. 3.

Referring in detail to the drawings:

In FIGS. 1, 2 and 3 a mixer is shown which has a trough-like body portion 20 which has a pair of longitudinal side walls 21, a bottom wall 22 and curved wall portions 23 connecting the side walls 21 with the bottom wall 22 (see FIGS. 8 and 9). The body portion 20 has end walls 24 and 25 (see FIG. 7), which have extensions 26 and 27 extending downwardly below the wall 22, and a flange 28 extending downwardly from said bottom wall, the extension 26 and the flange 28 being provided with ears 29 by means of which the body portion 20 is mounted on a base 30. The base 30 may be connected with a base 31 for the motor 32 by means of a structural member 33.

A pair of shafts 34 extend lengthwise of the troughlike body portion 20. The shafts 34 have reduced end portions 35 which are mounted in bearings 36 mounted on the end walls 24 and 25. The reduced shaft portions 35 extend outwardly beyond the end walls 24 and 25. The shaft portions 35 extending beyond the end wall 24 are mounted in bearings 37 and 38 provided on transverse walls 39 and 40 of a housing 41 mounted on the base 30, spacing members 42 being provided between end wall 24 and said housing 41. Bearings 43 are provided for the shaft portions 35 extending outwardly beyond the wall 24, the bearings 43 being mounted on a plate 44 mounted on the body portion 20 in spaced relation thereto by means of the spacing members 45.

Figure 6:
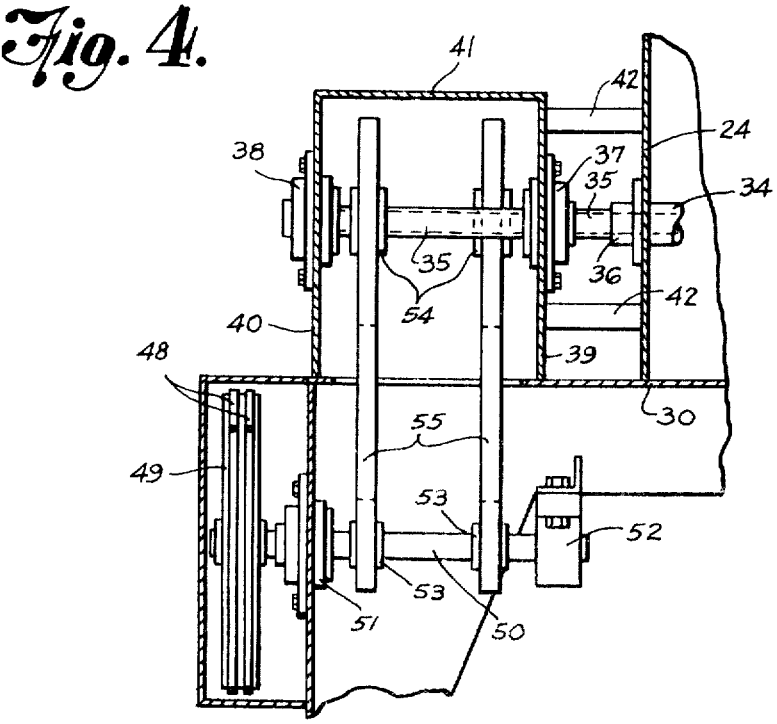
FIG. 6 is a fragmentary elevation thereof taken on the line 6—6 of FIG. 4.

The motor 32 has a shaft 46 provided with a pully 47. Belts 48 extend around the pulley 47 and around a pulley 49 provided on the shaft 50 to drive the shaft 50 by means of the motor 32. The shaft 50 is mounted in suitable bearings 51 and 52 provided on the base 30 (see FIG. 6), and a pair of sprockets 53 is mounted on the shaft 50 to rotate therewith. The reduced portions 35 of the shafts 34 that extend beyond the end wall 24 have the sprockets 54 mounted thereon to rotate therewith and sprocket chains 55 operate over the sprockets 53 and 54 to rotate the shafts 34 in a clockwise direction, as viewed from the left hand ends thereof in FIGS. 1, 2 and 7. The shafts 34 thus rotate at the same rate and in the same direction.

The body portion 20 has top wall portions 56, 57 and 58, the top wall portion 57 having a downwardly directed end portion 59 extending crosswise between the side walls 21 to provide a baffle extending downwardly from the top wall of the body portion 20 a substantial distance in spaced relation to the end walls 24 and 25. Inlet connections 60, 61 and 62 extend through to the top wall portion 56, the wet and dry ingredients of the dough mixture being supplied to said inlet connection continuously at a metered rate. The baffle 59 serves to prevent any of said ingredients from passing into the portion of the mixer between the baffle 59 and end wall 25, without being first mixed with the rest of the dough ingredients.

A plurality of flat faced paddles 63 extend outwardly from each of the shafts 34. The paddles 63 are arranged spirally around the shafts 54, being closely spaced in that portion of the body portion 20 between the end wall 24 and baffle 59, and extend into the portion of the mixer between the baffle 59 and end wall 25 in more widely spaced relation. Each paddle has a leading longitudinally extending side edge 64 and a trailing longitudinally extending side edge 65. The flat body portions of the paddles extend obliquely to the axes of rotation of the shafts 34 so that the trailing edges 65 are nearer the end wall 25 than the leading edges 64, and the paddles 63, upon rotation of the shafts 34, advance the dough mixture toward the end wall 25 and thus toward the dough discharge opening 66 adjacent said end wall.

A plurality of paddles 67 is provided on each of the shafts 34 extending spirally around said shafts from beyond the paddles 63 to near the end wall 25. One of the paddles 67 is shown more in detail in FIG. 10. Each of said paddles 67 has a flat faced body portion, the flat faces 68 and 69 extending at an oblique angle to the axis of rotation of the shaft 34 so that the trailing edge 70 thereof is nearer the end wall 25 than the leading edge 71. A round rod 72 is mounted in embracing relation on the leading edge 71 of each of the paddles 67 to extend longitudinally of said edge. The rod 72 is provided with a slot 73 in which the marginal portion of the flat body portion of the paddle 67 is mounted in fixed position in any suitable manner, as by welding. The rod 72 provides a thickened portion on each of said paddles 67 projecting beyond the flat faces thereof and extending lengthwise of said paddles, said thickened portions constituting ribs having transversely convexly curved surfaces and provide a convexly transversely curved blunt leading side edge on each of said paddles.

A flat paddle 74, similar to the paddles 63, is provided on each shaft 34 adjacent the end wall 25, but it is inclined relative to the axis of the shaft so that the leading edge 75 thereof is nearer the end wall 25 than the trailing edge 76 thereof. Rotation of the shaft 34 on which it is mounted will accordingly push the dough mixture it engages away from the end wall 25 and bearing 36.

The top wall of the trough-like body portion 20 is provided with an opening 77 therein which is out of alignment with the discharge opening 66, being located at a greater distance from the end wall 25 than the opening 66. A transverse wall is provided in the body portion 20 which has a portion 78 that inclines from the opening 77 toward the end wall 25 and a horizontal portion 79 connecting said inclined portion 78 with the end wall 25. The doughs produced by my mixer are of the character used in the making of pizzas and other similar products in which a thin disc of yeast fermented dough is used as the body portion thereof. The discs are cut out of a thin sheet of dough, which has been produced by first extruding the dough in a relatively thick narrow band and then sheeting it into the thin sheet from which the discs are cut. Because of the action of the extruding and sheeting means on the dough, and the fact that it has been fermenting and exposed to air during these various steps of producing the discs from the dough, the dough discs are much drier than the dough from which they had been made at the time it leaves the mixer. Considerable scrap is produced in cutting the discs from the sheeted dough. The scrap is continuously fed onto a conveyor 80 which carries it back to the mixer. The conveyor 80 shown in FIGS. 1, 2, 3 and 5 discharges said scrap dough into the opening 77 to be continuously mixed with the new dough ingredients that are being mixed by the action of the paddles 63 and 67.

The paddles 63 serve to thoroughly incorporate the wet and dry ingredients fed into the mixer through the inlet connections 60, 61 and 62. The mixture is first a slurry and then gradually the absorption of the wet ingredients into dry ingredients of the mixture forms a stiff mixture which is acted on by paddles 67 to first absorb all of the wet ingredients in the dry ingredients to produce what is known as hydration of the dough mixture and then to act on the hydrated dough mixture to develop the gluten contained therein.

When the absorption of the wet ingredients in the dry ingredients has been completed the dough mixture contains elongated gluten strands. By providing the paddles 67 with the blunt leading edges and rounded ribs produced by the bars 72, the gluten strands are stretched so as to strengthen the same, but are not cut up as would be the case if the rodlike members 72 were not provided on the paddles 67. By introducing the scrap dough into the mixer in a portion thereof in which the gluten in the newly produced dough mixture is being developed, the relatively dry scrap dough is thoroughly mixed with the new relatively wet dough being developed so that when the mixture of the newly produced dough and scrap dough reaches the discharge outlet 66 it is of uniform moisture content.

What I claim is:

1. A continuous dough mixer having an elongated trough-like body portion having a discharge opening adjacent one end thereof, means feeding dough ingredients into said mixer adjacent the other end of said body portion, a pair of parallel shafts extending lengthwise of said body portion, means rotating said shafts about the axes thereof in the same direction of rotation and paddles on said shafts, said paddles having flat faced body portions having the opposed flat faces thereof extending from said shafts at oblique angles to said axis, each of said body portions having a pair of longitudinal side edges one of which is a leading edge and the other a trailing edge of said paddle during rotation of said shafts, said flat faces extending to said trailing edges and thickened portions on certain of said paddles projecting outwardly from both opposed flat faces of said body portion longitudinally along said leading edges of said paddles.

2. The continuous dough mixer claimed in claim 1 in which said thickened portions are ribs having transversely convexly curved surfaces over the entire exposed areas thereof.

3. The continuous dough mixer claimed in claim 2 in which each of said shafts has a paddle thereon adjacent one end thereof that has flat faces extending relative to the direction of rotation of said shaft to move the dough engaging said paddle away from said end of said shaft.

4. The continuous dough mixer claimed in claim 2 in which said flat faces of said paddles having said ribs thereon extend relative to the direction of rotation of said shafts to move dough engaging said paddles toward said discharge opening.

5. The continuous dough mixer claimed in claim 1 in which said thickened portions provide a blunt side edge having a transversely convexly curved surface extending from one of said opposed flat faces to the other opposed flat face.

6. The continuous dough mixer claimed in claim 1 in which each of said shafts has a paddle thereon adjacent one end thereof that has flat faces extending over the entire area thereof relative to the direction of rotation of said shaft to move the dough engaging said paddle away from said end of said shaft.

7. The continuous dough mixer claimed in claim 1 in which said flat faces of said paddles having said thickened portions thereon extend relative to the direction of rotation of said shafts to move dough engaging said paddles toward said discharge opening.

8. The continuous dough mixer claimed in claim 1 in which said shafts have a plurality of paddles thereon that are each flat faced over the entire area thereof.

9. The continuous dough mixer claimed in claim 1 in which said shafts have paddles that are each flat faced over the entire area thereof, said last mentioned paddles having the flat faces thereof extending relative to the direction of rotation of said shafts to move the dough engaging said paddles toward said discharge opening.

10. A continuous dough mixer having an elongated trough-like body portion having a discharge opening adjacent one end thereof, means feeding dough ingredients into said mixer adjacent the other end of said body portion, a pair of parallel shafts extending lengthwise of said body portion, means rotating said shafts about the axes thereof and paddles on said shafts, said paddles having flat faces extending from said shafts at oblique angles to said axes and longitudinally extending side edges certain of said paddles each having a thickened portion thereon projecting outwardly beyond said faces provided by a round rod mounted in embracing relation to one of said side edges of each of said paddles.

11. A continuous dough mixer having an elongated trough-like body portion having a discharge opening adjacent one end thereof, means feeding dough ingredients into said mixer adjacent the other end of said body portion, a pair of parallel shafts extending lengthwise of said body portion, means rotating said shafts about the axes thereof and paddles on said shafts, said paddles having flat faces extending from said shafts at oblique angles to said axes and a baffle extending transversely of said body portion in spaced relation to said ends thereof to provide an ingredient incorporating zone that extends from said other end of said body portion to beyond said baffle and a dough hydrating and developing zone that extends from said incorporating zone to the end of said body portion adjacent said discharge opening.

12. The continuous dough mixer claimed in claim 11 in which certain of said paddles have thickened portions thereon projecting outwardly beyond said flat faces, said paddles having said thickened portions thereon being in the portion of said mixer that is between said baffle and said discharge opening.

13. The continuous dough mixer claimed in claim 12 in which said thickened portions are ribs having transversely convexly curved surfaces.

14. The continuous dough mixer claimed in claim 13 in which said shafts have paddles thereon that are each flat faced over the entire area thereof, and a plurality of said paddles that are flat faced over the entire area thereof are between said other end of said body portion and said paddles having said ribs thereon.

15. The continuous dough mixer claimed in claim 12 in which said shafts have paddles thereon that are each flat faced over the entire area thereof, a plurality of said paddles that are flat faced over the entire area thereof are between said other end of said body portion and said paddles having said thickened portions thereon, and each of said shafts has a flat faced paddle thereon adjacent said one end of said body portion that has the flat faces thereof extending relative to the direction of rotation of said shaft to move the dough engaging said paddle away from said end of said body portion.

16. The continuous dough mixer claimed in claim 15 in which means is provided for feeding scrap dough into said hydrating and developing zone.

17. The continuous dough mixer claimed in claim 15 in which a feed opening out of alignment with said discharge opening leads into said hydrating and developing zone and continuously operating means feeds scrap dough into said hydrating and developing zone through said feed opening.

18. The continuous dough mixer claimed in claim 11 in which means is provided for feeding scrap dough into said hydrating and developing zone.

19. The continuous dough mixer claimed in claim 11 in which a feed opening out of alignment with said discharge opening leads into said hydrating and developing zone and continuously operating means feeds scrap dough into said hydrating and developing zone through said feed opening.

* * * * *